(12) United States Patent
Lincoln

(10) Patent No.: US 6,443,658 B1
(45) Date of Patent: Sep. 3, 2002

(54) RAM BURSTER

(76) Inventor: David A. Lincoln, 5500 E. 56th Ave., Commerce City, CO (US) 80022

( * ) Notice: Subject to any disclaimer, the term of this patent is extended or adjusted under 35 U.S.C. 154(b) by 0 days.

(21) Appl. No.: 09/609,807

(22) Filed: Jul. 3, 2000

Related U.S. Application Data

(63) Continuation-in-part of application No. 09/054,353, filed on Apr. 2, 1998, now Pat. No. 6,109,832.

(51) Int. Cl.⁷ .............................................. F16L 1/028
(52) U.S. Cl. ........................ 405/184.1; 405/184; 175/53
(58) Field of Search ........................... 175/53; 405/184, 405/154, 156, 184.1, 154.1

(56) References Cited

U.S. PATENT DOCUMENTS

| | | | | |
|---|---|---|---|---|
| 4,789,268 A | * | 12/1988 | Yarnell | 405/154 |
| 5,302,053 A | * | 4/1994 | Moriarty | 405/154 |
| 5,816,745 A | * | 10/1998 | Tenbusch, II | 405/184 |
| 6,098,708 A | * | 8/2000 | Jenne | 166/55.3 |
| 6,109,832 A | * | 8/2000 | Lincoln | 405/184 |

* cited by examiner

*Primary Examiner*—David Bagnell
*Assistant Examiner*—Zakiya Walker
(74) *Attorney, Agent, or Firm*—Dorr, Carson, Sloan & Birney, P.C.

(57) ABSTRACT

An improved method and apparatus for trenchless placement of pipe or conduit that allows termination at a vault or manhole structure without destruction of the vault or manhole. The specific improvement is the means of making the bursting ram and all components used in the procedure (but for the replacement pipe) disassemblable in a small space, such as a vault or manhole. The disclosed improvement is a means to keep the bursting ram together during use but then to allow the bursting ram after it enters into the manhole or vault, to be disassembled with hand tools and removed in parts without destruction or damage to the vault structure. This makes the trenchless placement of conduit or piping non-destructive over the distance of the route as well as at the termination at a manhole.

4 Claims, 13 Drawing Sheets

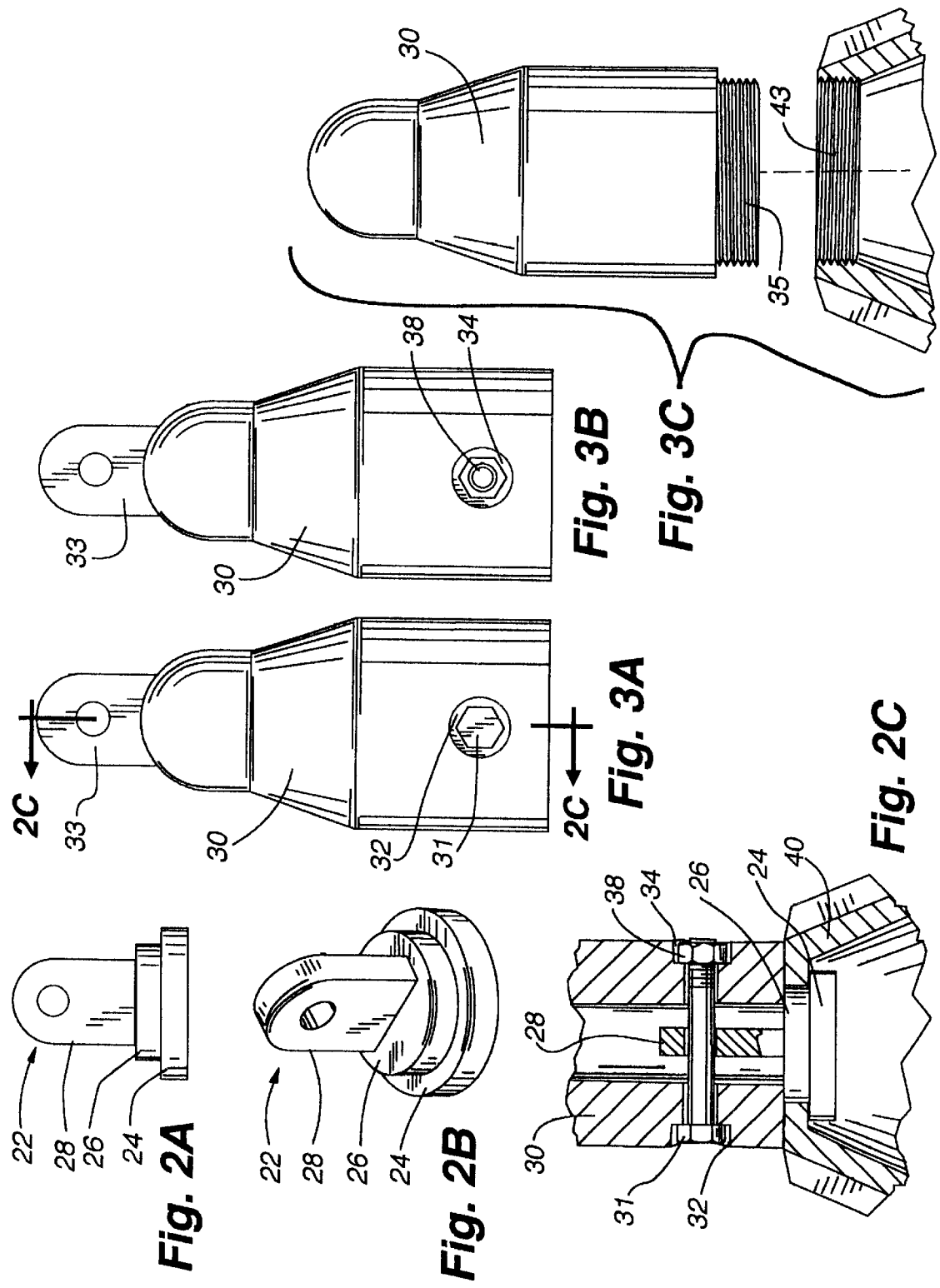

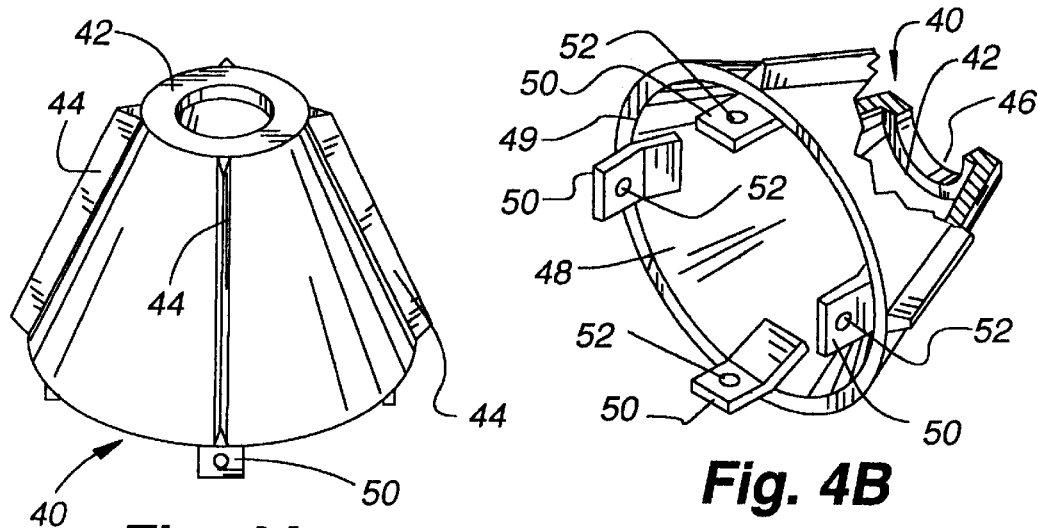
Fig. 4A
Fig. 4B
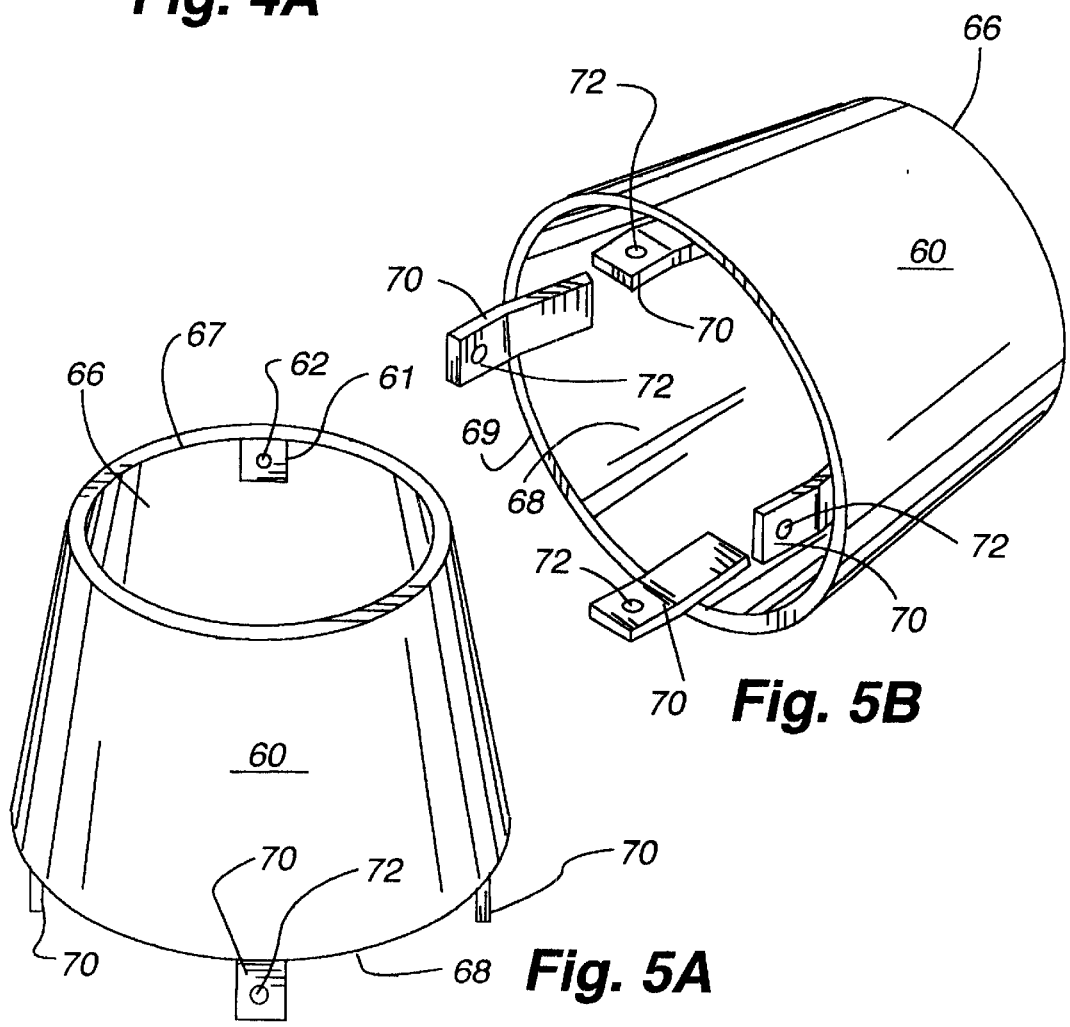
Fig. 5B
Fig. 5A

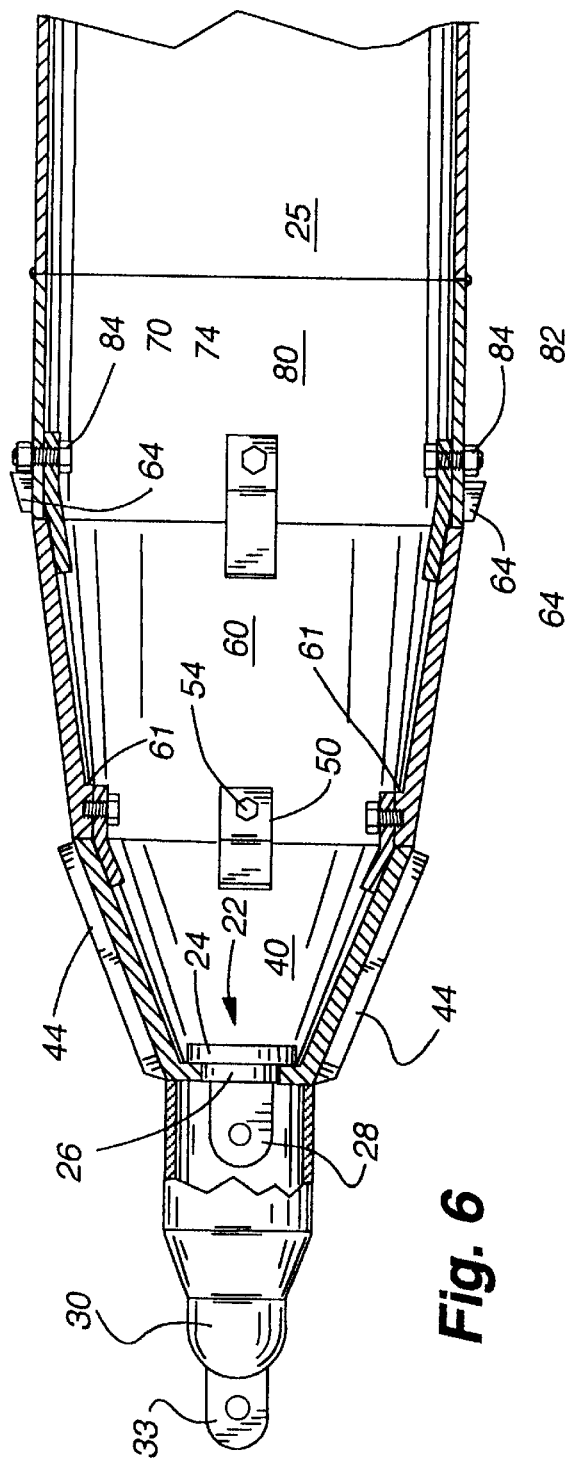
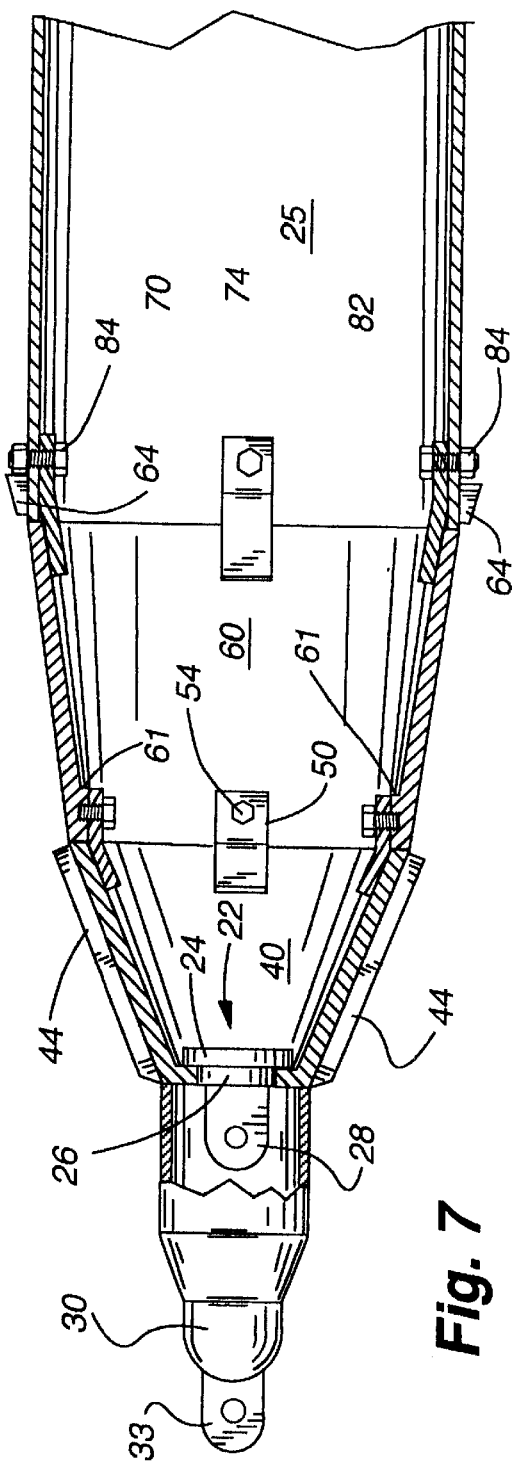

RAM BURSTER

FIELD OF THE INVENTION

This application is a continuation in part and is copending with application Ser. No. 09/054,353 with identical inventors filed on Apr. 2, 1998 now U.S. Pat. No. 6,109,832.

This invention relates to improved techniques and apparatus for new installation or replacement of underground pipelines, gas mains, water and sewer lines and other service and utility conduits. The apparatus and method are for creating a tunnel to accommodate new piping, inserting the new piping, and doing so without the need to excavate the tunnel or excavate or enlarge any man-hole or utility vault along the line or to create large openings at the destination location. The apparatus can work with a pilot hole or with preexisting pipe. The original pipe can be any fracturable material. Also the apparatus and method allows for substantial enlargement of preexisting line opening and the subsequent or simultaneous use of a multitude of different types of piping materials, thus meeting the needs of utility companies like water providers to use standard materials for the use of their district.

BACKGROUND OF THE INVENTION

The underground location of lines and conduit for the many utilities in service today means that replacement of existing lines with new conduit lines is more complicated and necessitated due to age and deterioration, accidental breaks or population and usage growth making existing lines obsolete. Often the lines were installed with open trenches many years ago and subsequently new developments, such as roads, housing or landscaping have gone in over the surface, thus making re-excavation impossible or unacceptable. Also excavation methods are expensive in man power, equipment and risk of injury or damage.

There are numerous methods in use and available to replace old or outdated lines with new line material and without extensive excavation, but each has a variety of drawbacks or limitations. The commonly used method to replace pipe without excavation of which this invention is an improvement is called pipe bursting. Streatfield, U.S. Pat. No. 4,738,565 is one such method. It makes use of a conical shaped mole that is forced through an existing pipe and, in turn, pulls the new piping into the space. The bursting occurs when the mole is forced into the pipe. The mole is shaped such that it is smaller than the inside diameter of the old pipe at one end of the mole and larger than the inside diameter of the pipe at the other end of the mole and thus causes the original pipe to be fractured or, by other methods, cut. The object is to destroy and displace or remove the original pipe structure to then allow the new replacement pipe's structure to take the place of the original. Thus the new pipe replaces the old pipe without excavating along the entire length of the pipe being replaced.

The methods, such as the above, however, generally require that two excavations be made—one at the start of the pipe bursting and the second at the end. This then accomplishes the replacement in that section. If more than one section is to be replaced, then successive points of excavation are made to accommodate the equipment and tools used to force the mole to do its job. For the mole tool to be started in the correct manner at the start of the hole a large excavation is necessary and another large excavation is needed to allow the mole tool to be removed at the end joint. Most of the current methods make use of equipment and tools that require the end point to be excavated even if there is access through a manhole vault at the location because the removal of the tool at the end requires a larger opening than the manhole vault. This causes problems as the manholes themselves are expensive structures to replace. Usually a manhole vault is in the system and often is located in a roadway. The previous methods require excavation of the manhole or vault which means that the excavation will impede traffic while the excavation is made, used and finally replaced and repaired. The necessity to excavate in streets is often regulated by local government to prevent an unacceptable number or timing of street cuts. Thus construction projects may have to be delayed for city permits.

PRIOR ART DISCLOSURE STATEMENT

Boring machines are often used to create holes in soil without the necessity of digging trenches. These can be with ram like action such as percussive devices. See Chepurnoi, U.S. Pat. No. 3,952,813, where a hammer drives a pointed end piece through the soil. Also it is known to drive a hollow pipe through the soil, then evacuate the pipe to leave the pipe available for various uses. Alternately the bore may be created by a drilling head that drills the hole.

There are numerous methods to burst an existing pipe to be replaced by a new pipe, done in a single operation. These methods and apparatus use drill or cutting heads with hammer-like driving forces used to move the head and pull the replacement pipe into the newly created hole. These include Parish, U.S. Pat. No. 5,628,585, where the replacement pipe is polyorefin and the old pipe is cut, chipped and ground away by roller bits worked by a drive shaft, and also Granella, U.S. Pat. No. 5,403,122.

The use of pulling means to draw the bursting tool and new pipe is used in Gherrington, U.S. Pat. No. 5,456,552, Luksch, U.S. Pat. No. 5,076,731, Torielli, U.S. Pat. No, 5,192,165, and Moriarty, U.S. Pat. No. 5,302,053.

Alternately, the bursting tool and pipe may be driven by a hammer that fits inside the pipe such as in Fisk, Re 35,271 and Re 35,542, and Kayes, U.S. Pat. No. 5,480,263, and Streatfield, U.S. Pat. No. 4,738,565 which also alternatively uses a pulling method.

Some methods make use of ramming force exerted at the bursting head through a hydraulic or pneumatic force applied inside the piping. As the head advances new sections of pipe are added and pushed forward—not as the force to move the head but merely to advance the new pipe in conjunction with the head. See, Tenbusch, U.S. Pat. No. 5,482,404.

All of the above methods have deficiencies. None address the issues of pipe bursting into a confined location to avoid having extensive and expensive excavation at the exit point or the ability to increase the size of the pipe substantially.

SUMMARY OF THE INVENTION

The present invention, techniques and apparatus are disclosed for installing new pipe or replacing old pipe with new pipe of the same or larger diameter, in such a manner as to be able to do the installation without trenching and also allowing the installation to be to a vault or man hole without the necessity of destroying the man hole or vault, or excavating a large hole at the man hole location.

The features of the present invention allows for forces being applied from the rear as in a ramming force, from the front as in a pulling force or a combination of these, all dependent upon the circumstances to be dealt with. The apparatus has a bursting ram that breaks up the old pipe or enters a pilot hole and expands the opening to the required size equaling the size of the new pipe. The tubular casing is installed and inserted in the new opening at the same time. The bursting ram has a fracturing mandrel. It can have a front opening that is fitted with a floating eye. When being pulled the floating eye covers the front opening. A cap may cover the floating eye. At the end of the job the floating eye is released allowing the front opening to be opened for access to the interior of the bursting ram for disassembly of the apparatus.

As the preferred embodiment of this improved fracturing mandrel, the T assembly with a connecting eye extends from the forward aperture of the fracturing mandrel. The T piece extends from the rear aperture of the fracturing mandrel. The T assembly is removably attached to a structure piece in the casing, expansion mandrel or a connecting carrier ring to form a connection of the fracturing mandrel and the next piece.

In some circumstances the fracturing mandrel is attached to the casing. In other circumstances, the fracturing mandrel is connected to an expansion mandrel for further enlarging the hole. Also there can be a carrier ring of the same diameter as the casing to allow for easy field installation. As the assembly is driven into the vault, the components are disassembled thus allowing for the removal of the bursting ram in limited space.

An alternate embodiment, where there is no pulling force applied, entails a centering head that removably covers the front opening of the fracturing mandrel. The centering head is disassembled, which then in turn allows access to the interior for disassembling the bursting ram.

BRIEF DESCRIPTION OF THE DRAWINGS

FIG. 2A is a profile view of the floating eye;

FIG. 2B is a perspective view of the floating eye;

FIG. 2C is a perspective view of the centering cap holding the floating eye;

FIGS. 3A and 3B are side views of the centering cap;

FIG. 3C illustrates an alternative embodiment of the centering cap and mating lip of the fracturing mandrel;

FIG. 4A is a perspective view of the fracturing mandrel;

FIG. 4B is a cutaway perspective view of the fracturing mandrel;

FIGS. 5A and 5B are perspective views of the expansion mandrel;

FIG. 6 is a cutaway profile view illustrating the carrier ring connected between the casing and the bursting ram;

FIG. 7 is a cutaway profile view illustrating the bursting ram connected directly to the casing;

DETAILED DESCRIPTION OF THE DRAWINGS

Figure 1A:
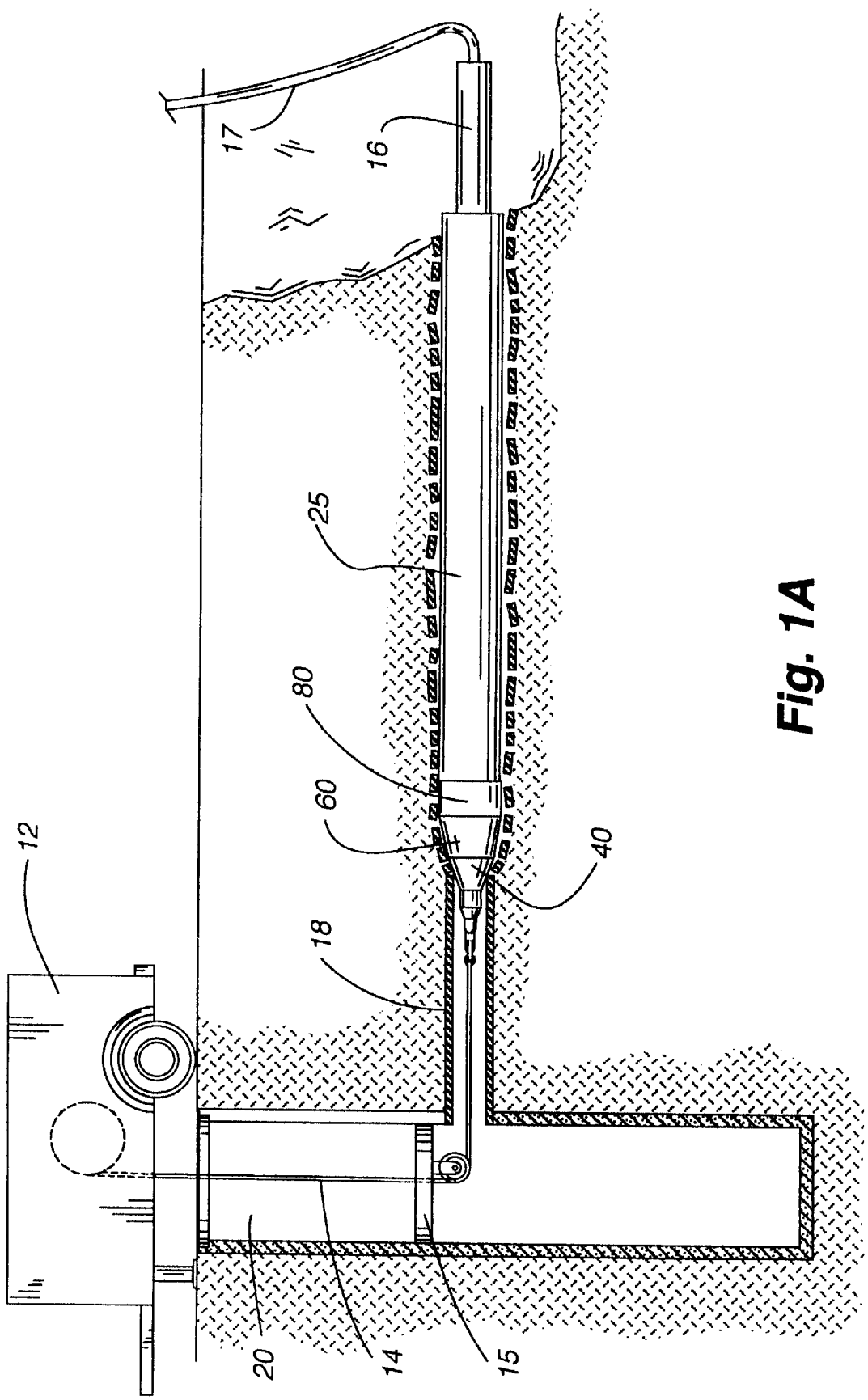
FIG. 1A is a side view of the bursting ram as utilized to replace pipe with casing.
Figure 13:
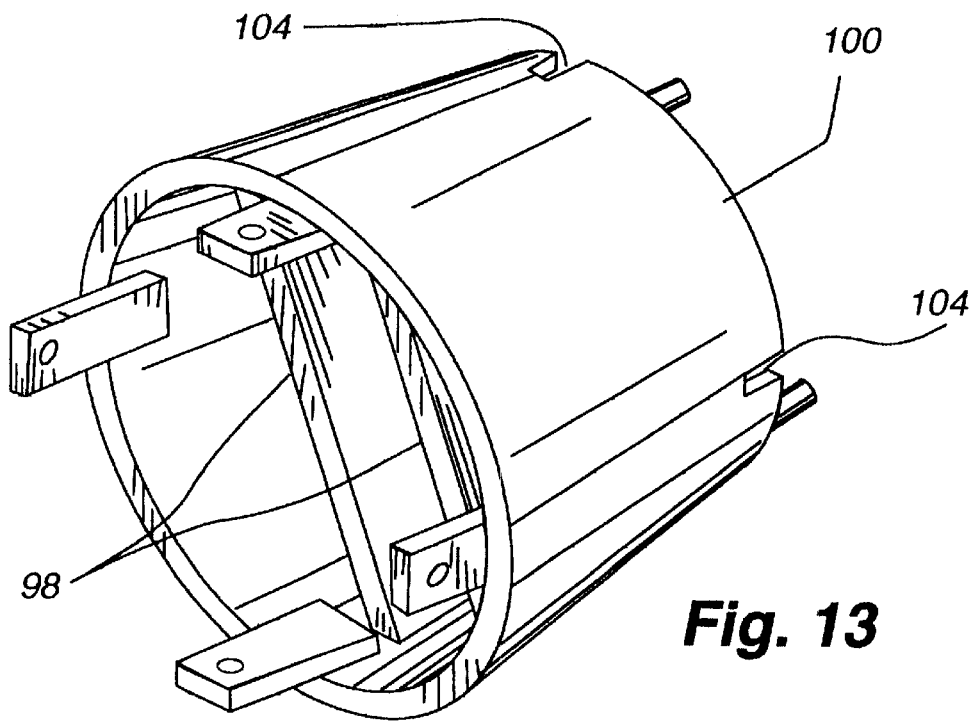
FIG. 13 view of rear of connector piece with interior cross pieces which engage the T assembly.
Figure 14:
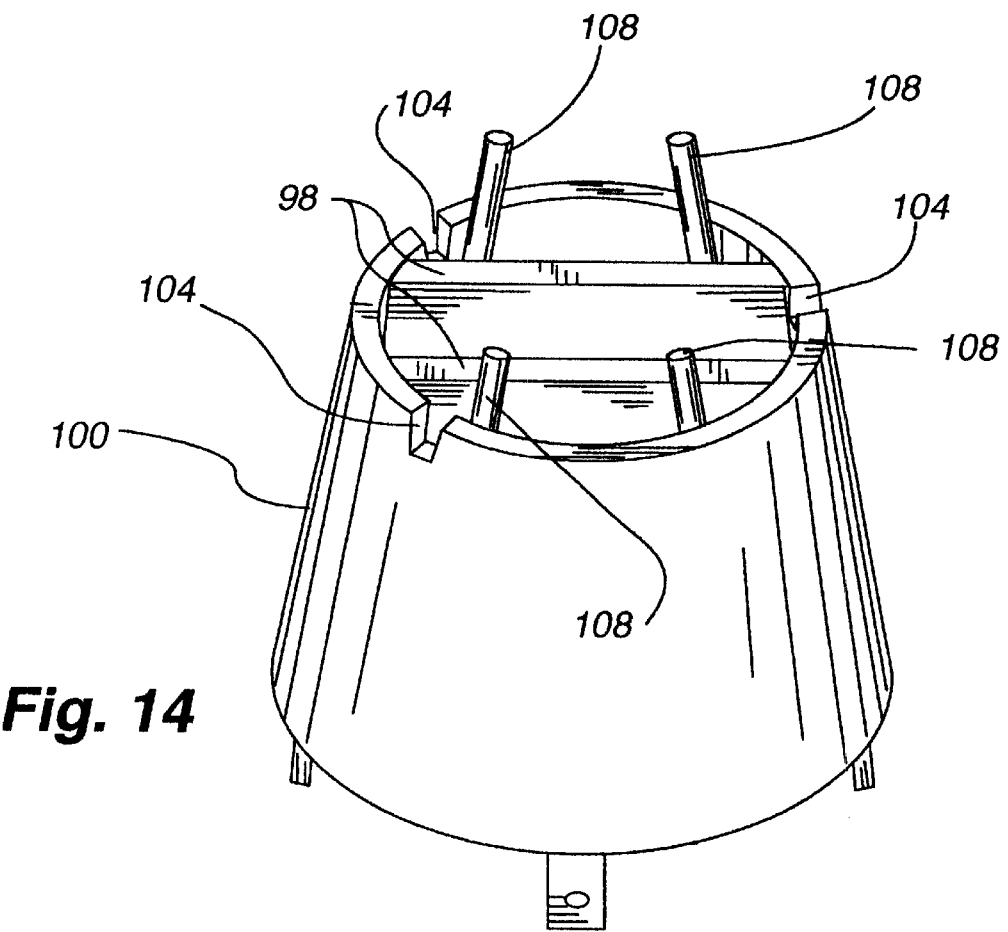
FIG. 14 view of forward portion of connector piece showing interior cross pieces, notches for fracturing mandrel and support pieces.

As shown in FIG. 1A, the bursting ram 10 may be used to fracture and expand existing pipe 18, while replacing the fractured debris with new casing 25. The bursting ram 10 may be driven percussively by a hydraulic or pneumatic hammer 16 or other driving apparatus, acting on the end of the casing, or drawn through the existing pipe 18 by a rope, chain or cable 14 connected to winch 12, or utilize both methods in combination. The bursting ram 10 may comprise several detachable sections, thus allowing the bursting ram 10 to be disassembled and removed from a manhole or vault 20 without excavation. A fracturing mandrel 40 or 90 may be coupled with one or more expansion mandrels 60, and may include a floating eye 22 and a centering cap 30. In the improved fracturing mandrel the connecting eye, by way of rod and a T flange, is used to connect the fracturing mandrel to the next component, a connector piece, FIG. 13 and FIG. 14. (i.e. carrier ring, expansion mandrel or casing or pipe adapted with an adaptor ring). A carrier ring 80 may be attached to the rear aperture 68 of the expansion mandrel 60 or the rear aperture of the fracturing mandrel to provide an interface between the bursting ram 10 and the casing 25. Or with an adaptor ring, a floating eye 22 may be the connection eye provided near the front of the bursting ram 10 to provide a connection point for cable 14. In one embodiment, as illustrated in FIGS. 2A and 2B, the floating eye 22 comprises a flanged plate 24 attached in a perpendicular relationship to a connecting eye 28. The flanged plate 24 may include a recessed edge 26 along its periphery, thus allowing the floating eye 22 to mate securely with the fracturing mandrel 40 when placed inside the fracturing mandrel 40 and brought in contact with a flanged mating lip 42 located at the forward aperture 46. When the floating eye 22 and fracturing mandrel 40 are configured in this manner, the connecting eye 28 protrudes from the front of the bursting ram 10 and presents a connecting point by which the cable 14 may be attached to the bursting ram 10. The tension in the cable 14 maintains a seal between the flanged plate 24 and the mating lip 42, thus preventing dirt or debris from entering the bursting ram 10 and casing 25. When tension in the cable 14 is released, the floating eye 22 may be easily dislodged backward into the fracturing mandrel 40 to allow disassembly of the bursting ram 10 through the forward aperture 46.

Figure 15:
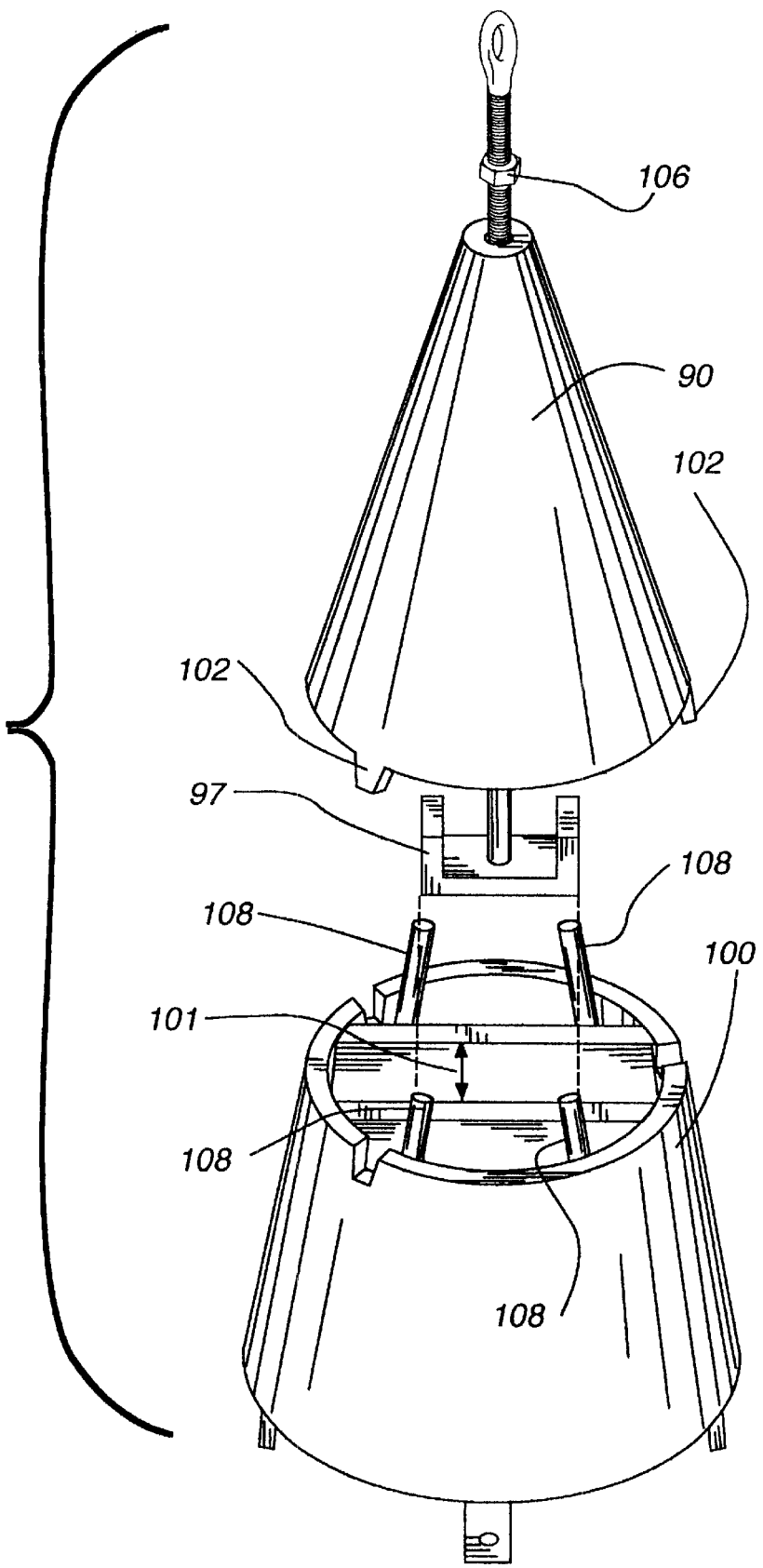
FIG. 15 perspective view showing orientation of fracturing mandrel with T assembly during insertion of T piece into connector piece between the interior cross pieces.
Figure 16:
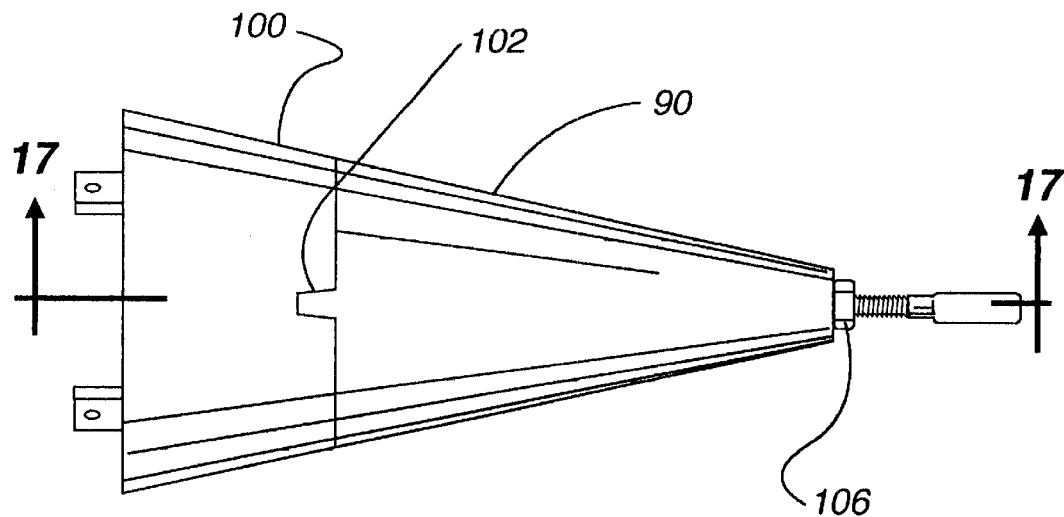
FIG. 16 side view of fracturing mandrel and connector piece assembled.
Figure 17:
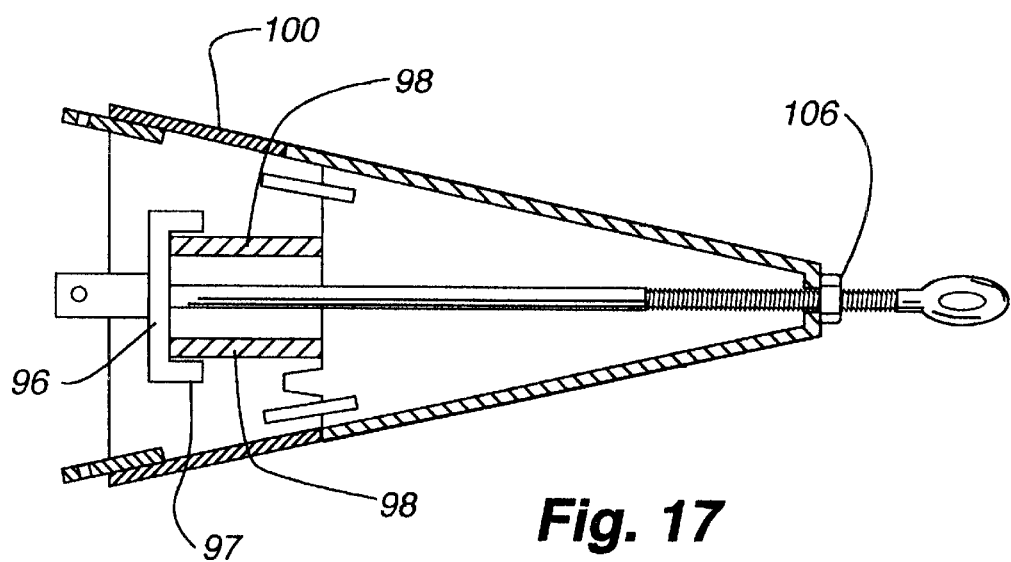
FIG. 17 interior view of FIG. 16 cut through line B—B

A preferred means of attaching the fracturing mandrel to the pipe, casing, expansion mandrel, or carrier ring and connecting eye to the cable 14 is shown in FIGS. 15, 16, and 17.

Figure 10:
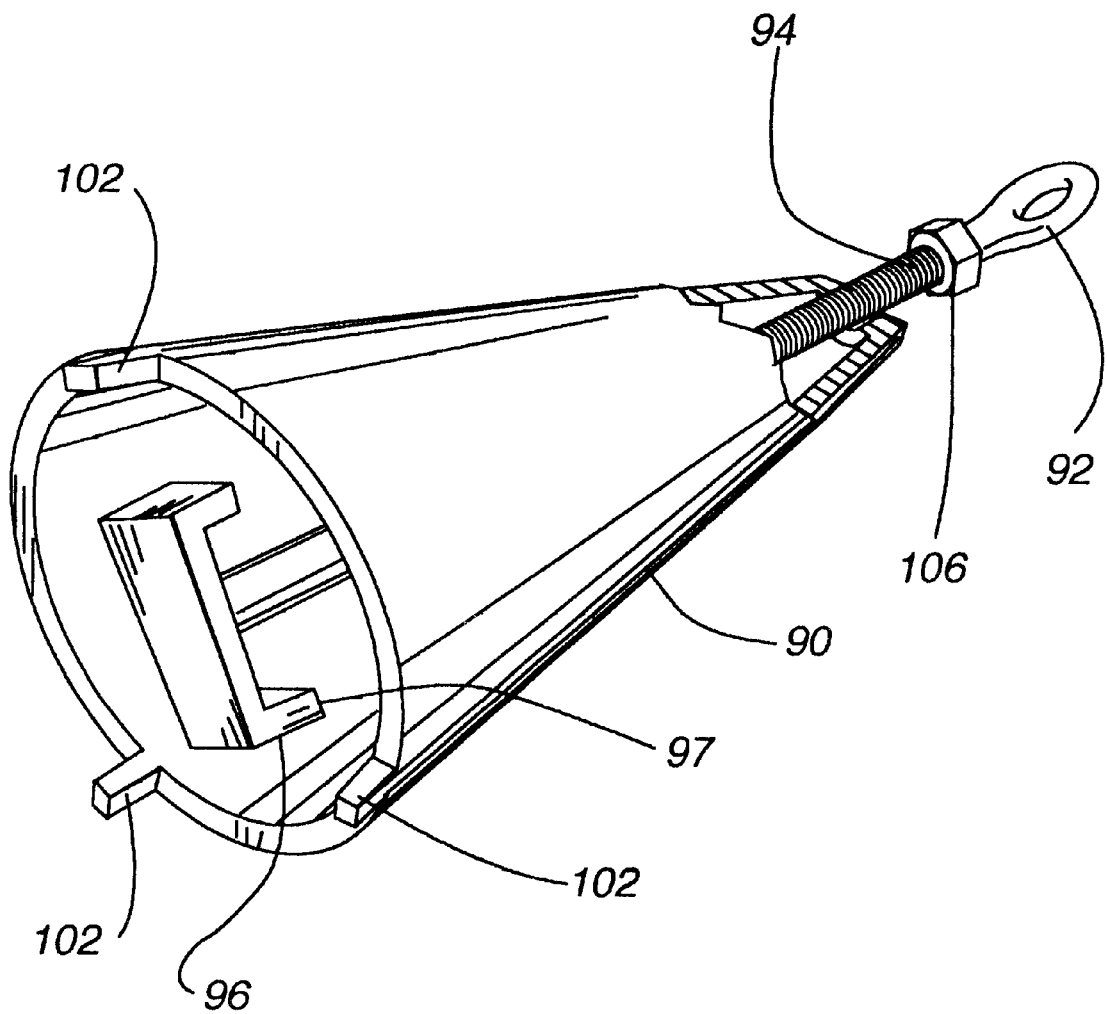
FIG. 10 an improved connecting means to attach the fracturing mandrel to the connector and casing.
Figure 12:
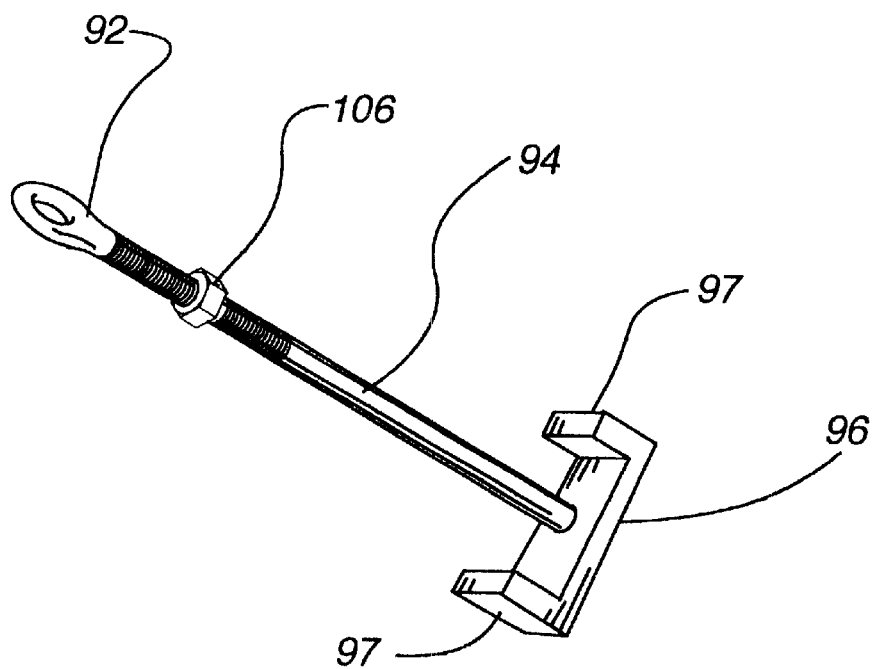
FIG. 12 view of T assembly.

The connecting eye 92 is connected to a T assembly, FIG. 12, which is rotatably housed in a hole of the fracturing mandrel along the central axis, FIG. 10. The T assembly is comprised of a shaft 94 and on one end of the shaft a component, the T piece 96, that is orthogonal to the center axis of the burster and on the opposite end of the shaft is the connecting eye. When installed, the connector piece (expansion mandrel, carrier ring, or casing) in this embodiment has two interior cross pieces 98 that are parallel and whose forward surfaces are perpendicular to the central axis. The two are off set from the central axis sufficiently creating a width greater than the T piece 96 when in a parallel orientation to the interior cross pieces 98 and thus allow the T piece to pass between the two cross pieces, see FIG. 15. When engaged the T piece is situated and as its length is wider than the cross piece space and is perpendicular to the parallel interior cross pieces of the fracturing mandrel and on the posterior side of the two cross pieces, see FIG. 17. At the ends of the T piece are lip protrusions 97 that extend over the edges of the parallel interior cross pieces as seen in FIG. 17.

To assemble the fracturing mandrel to the connector piece, the T piece 96 is oriented to be parallel to the fracturing mandrel cross pieces, see FIG. 15. The T piece is just wide enough to fit between 101 the parallel cross pieces 98 when so oriented. The fracturing mandrel with the T assembly is moved rearward so that the T piece moves toward the posterior end of the connecting piece, see FIG. 17. The position of rotation of the connecting eye on the end of the T assembly is here used as an indicator of the position of the T piece; however, any indicator may be used.

The eye 92 and T piece 96 are both rigidly connected to the shaft 94. The connection of the T piece may be removable for maintenance. Alternate connectors are known and useable in place of the T assembly. The shaft 94 between the connecting eye and the T piece allows the T piece to be extended rearward enough during assembly to allow the T piece to be rearward of the rear face of the interior cross pieces 98. To engage, the T assembly is then rotated 90° around the center axis and the shaft, making the T piece perpendicular to the interior cross pieces of the fracturing mandrel. (FIG. 17)

The interference of the T piece, being longer than the space separating the cross pieces, creates a positive engagement of the T flange and the cross pieces when the connecting eye is pulled forward, see FIG. 17. The lip extension on the ends 97 of the T piece extend over the exterior edges of the interior cross pieces, thus limiting the opportunity for any rotation of the T flange during the work and thus inhibiting the T flange from becoming disengaged from its connection.

To further make a positive engagement the shaft and eye are used as an indicator of the orientation of the T piece and the three tongues 102 and notches 104 that are on the mating surface of the fracturing mandrel and the anterior surface of the connector piece are used to indicate the position of the interior cross pieces 98 i.e. one of the notches is between the parallel cross pieces. By noting the position of the cross pieces, from the notch indicators 104, the perpendicular positioning of the T piece by noting the connecting eye indicator for the T piece, the maximum engagement is assured.

To further positively engage the T piece with the cross pieces, once the perpendicular orientation of the T piece and cross pieces are made, the nut 106, or other suitable connector, on the shaft is tightened down on the threads on the shaft as a collar to engage the forward aperture of the fracturing mandrel. In this position, the shaft is prevented from moving rearward thus keeping the engagement correct.

Finally, a locking mechanism such as a locking pin, cotter pin, friction collar or other common means is used to keep the nut from backing off or loosening.

Many means of engaging the connection are available other than the T assembly. Similarly the indicator means and locking means may be accomplished by other means. All of these alternatives are contemplated as a means to practice the within invention.

The connector piece has supports 108 extending out of the forward aperture to prevent misalignment of the fracturing mandrel and thus inhibit the opening of any space within the fracturing mandrel and connector assembly during work. These structural supports may be pipes or structural bars or flat metal pieces, sufficiently stiff and strong to keep the two components (FIG. 17) axially oriented along the center axis of the burster.

At the time of disassembly the T assembly with the connecting eye, shaft and T piece is pushed rearward after disengaging the lock and loosening the nut to a point to allow the T piece and lips to be rearward of the rearmost parts of the cross pieces of the connecting piece. The T piece 96 is thus able to be rotated 90° to again be oriented parallel to the interior cross pieces 98 and the T assembly is then drawn from the connector piece and disconnected from the assembly. This then yields an opening in the connector piece for further disassembly of the head of the ram burster.

The centering cap 30 may be provided as an alternative attachment point for the drawing means or as an alignment guide for the bursting ram 10, and assist the centering of the bursting ram 10 within the existing hole or pipe 18 as an alternate apparatus. A handling eye 33, is the attachment point, fabricated from a flanged section of steel or other suitable material and having a central bore, may be attached at the forward point of the centering cap 30 and used for handling the centering cap 30. When used in combination with the floating eye 22, the centering cap 30 may be placed over the connecting eye 28 adjacent to the forward aperture 46 of the fracturing mandrel 40. The centering cap 30 may be secured by placing a threaded bolt 31 through a recessed bore 32 in the side of the centering cap 30, through the connecting eye 28, and fastening the bolt 31 to a threaded nut 38 placed in a recessed bore 34 on the opposite side of the centering cap 30 (FIGS. 3A and 3B).

Alternatively, when there is no pulling means and when the centering cap 30 includes a threaded connection 35 as shown in FIG. 3C, the floating eye 22 is not necessary and the centering cap 30 may connect directly to the threaded mating lip 43 in fracturing mandrel 40.

Figure 11:
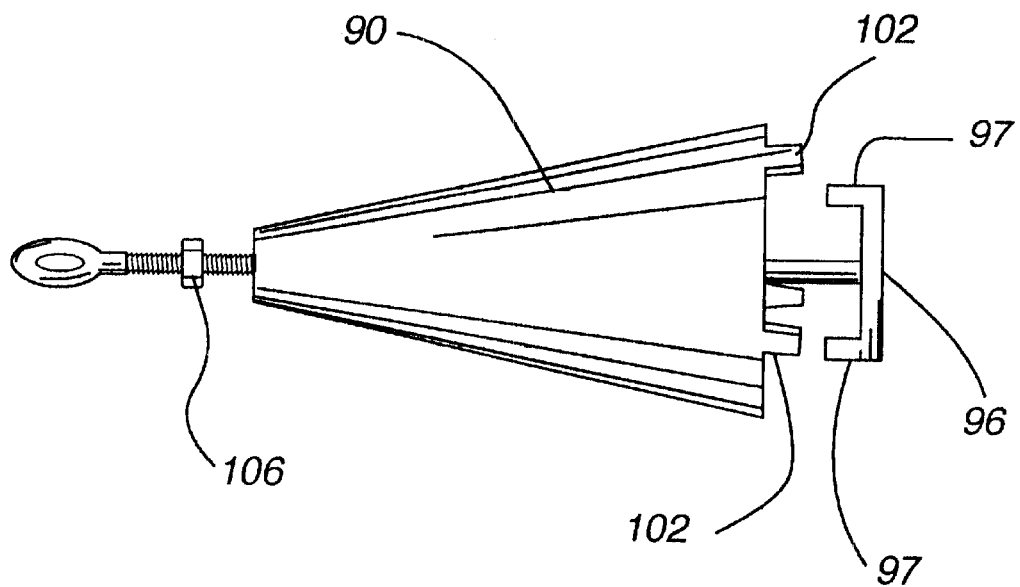
FIG. 11 view of side of fracturing mandrel with T assembly.

FIGS. 4A and 4B illustrate the fracturing mandrel 40. The fracturing mandrel 40 is the portion of the bursting ram 10 that fractures the existing pipe 18. The fracturing mandrel 40 or 90 may have a frusto conical shape that extends from a forward aperture 46 to a larger, rear aperture 48. Other tapered shapes may be used for the fracturing mandrel means, provided it has a rear interface sufficiently shaped to connect to the casing 25, expansion mandrel 60, or carrier ring 80. The forward aperture 46 may incorporate the mating lip 42 that mates with the flanged plate 24 of the floating eye 22. In the alternative embodiment of FIGS. 10 and 11, the fracturing mandrel on the inside has the T assembly extending forward from the forward aperture. Fracturing surfaces 44, attached at a plurality of points along the outside surface of the fracturing mandrel 40 and extending lengthwise along the outside surface of its body, incorporate raised surfaces extending radially outward from the outer surface of the body of the bursting ram 10. The tapered body of the fracturing mandrel 40 or 90 directs force to the existing pipe 18 or bore walls in a radially outward direction, with the force concentrated on the edges of the fracturing surfaces 44 where the fracturing surfaces 44 meet the inner surface of the existing pipe 18. The fracturing surfaces 44 also help prevent the bursting ram 10 from twisting as it is driven or drawn through the existing pipe 18. The fracturing surfaces 44 may also be arranged to protect fasteners used to connect the fracturing mandrel 40 to the casing 25 or carrier ring 80 in the event that an expansion mandrel 60 is not used.

In the preferred embodiment of the connector piece 100, the interior cross pieces 98 are parallel to each other, but perpendicular to the central axis. They extend from one side of the interior of the fracturing mandrel to the opposing side of the interior, see FIG. 14. They are oriented with a spacing between them 101. The central axis runs thru the spacing and the spacing is wide enough to allow the width of the T piece to fit between them when the T piece length is oriented in a parallel orientation to the cross pieces, see FIG. 15.

A coupling attachment provided at the rear aperture of the connector piece 100 on the inside surface of the connector piece attaches the connector piece to the pipe or casing. The coupling attachment may comprise rigid tongues 50 attached to the inner surface of the body of the fracturing mandrel 40 that extend out from the rear aperture 48. The connector piece may be an expansion mandrel, connecting ring or other adapter.

A bore 52 is included through the exposed portion of each tongue 50, which aligns with threaded bores 62 on the inside surface of the casing or pipe or bores with nuts when the forward aperture 66 of the expansion mandrel 60 is placed adjacent to the rear aperture 48 of the connector piece 100. The connector piece 100 is attached to the expansion mandrel 60 by placing threaded bolts 54 through the bores 52 and fastening them into the threaded bores 62 in the expansion mandrel 60. In instances where the pneumatic hammer 16 or other driving apparatus is attached to the casing 25 to drive the bursting ram 10 through pipe or pilot holes, force is transmitted axially from the forward face of the casing 25 or carrier ring 80 to the rear face 69 of the expansion mandrel 60, and from the forward face 67 of the expansion mandrel 60 to the rear face 49 of the connector piece 100.

The expansion mandrel 60 displaces the fractured pieces of pipe 18 or bore walls and enlarges the existing hole. While FIGS. 6 and 7 show the expansion mandrel 60 having a taper with a smaller angle from the central axis than the taper of the fracturing mandrel 40, the expansion mandrel 60 could have a larger angle or the same angle as the fracturing mandrel 40 to create a continuous tapered edge between the two mandrels. Directing attention to FIGS. 5A and 5B, the body of the expansion mandrel 60 has a frusto conical shape similar to the shape of the fracturing mandrel 40, with a body slightly larger in diameter than the body of the fracturing mandrel 40. The forward aperture 66 of the expansion mandrel 60 is of similar diameter and shape as the rear aperture 48 of the fracturing mandrel 40, thus presenting a suitable mating edge. Raised surfaces 61, located on the inner surface of the expansion mandrel 60 near the forward aperture 66, contain threaded bores 62 that align with the tongues 50 and bores 52 of the fracturing mandrel 40. The body of the expansion mandrel 60 expands to a diameter at the rear aperture 68 that is approximately the same diameter as the casing 25 to be installed. A coupling attachment similar to that of fracturing mandrel 40 is provided at the rear aperture 68 of the expansion mandrel 60, and attaches the expansion mandrel 60 to the casing 25, or to carrier ring 80 that attaches the casing 25 and expansion mandrel 60.

The tongues 50 in the preferred embodiment are angled as to protrude from the rear aperture 68 of the expansion mandrel 60 in a substantially parallel relationship with the central axis of the casing 25.

Carrier ring 80 may be provided as an interface between the bursting ram 10 and the first section of casing 25 to be installed. In the preferred embodiment, the carrier ring 80 is a cylindrical section of casing that includes a forward aperture 86 and a rear aperture 88. The carrier ring 80 provides a detachable connection at the forward aperture 86 for the expansion mandrel 60, and the rear aperture 88 may be welded to the first section of casing 25 that is to be installed. Upon completion of a bursting operation, the expansion mandrel 60 may be detached from the carrier ring 80, leaving the carrier ring 80 in the ground as part of the casing 25. The carrier ring 80 has bores 82 located near the forward aperture 86 that align with the bores 72 in the tongues 70 when the expansion mandrel 60 is placed adjacent to the carrier ring 80. The carrier ring 80 may be fitted and removably installed at any convenient location to provide quick and easy assembly at the job site. Because the carrier ring 80 in the preferred embodiment is fabricated from a section of casing 25 that has a wall thickness of approximately 0.5 inch, it is desirable to weld threaded nuts 84 on the outside surface of the carrier ring 80 directly over the bores 82. The expansion mandrel 60 and carrier ring 80 are fastened together by placing threaded bolts 74 through bores 72 and bores 82 and fastening them into the threaded nuts 84. To protect the threaded nuts 84, protective fins 64 may be attached to the outside surface of the carrier ring 80 forward of each threaded nut 84. The protective fins 64 are wedge shaped pieces that extend outward and rearward from the surface of the carrier ring 80 (FIG. 6). The protective fin 64 has a width approximately the diameter of the threaded nut 84, and it extends radially outward from the outer surface of the carrier ring 80 to approximately the height of the threaded nut 84. In the event that the carrier ring 80 is not used, and the bursting ram 10 is connected directly to a section of casing 25, the protective fins 64 may be attached to the casing section or to the expansion mandrel 60, and the casing section may incorporate bores 82 and threaded nuts 84 welded to its outer surface (FIG. 7).

Figure 8:
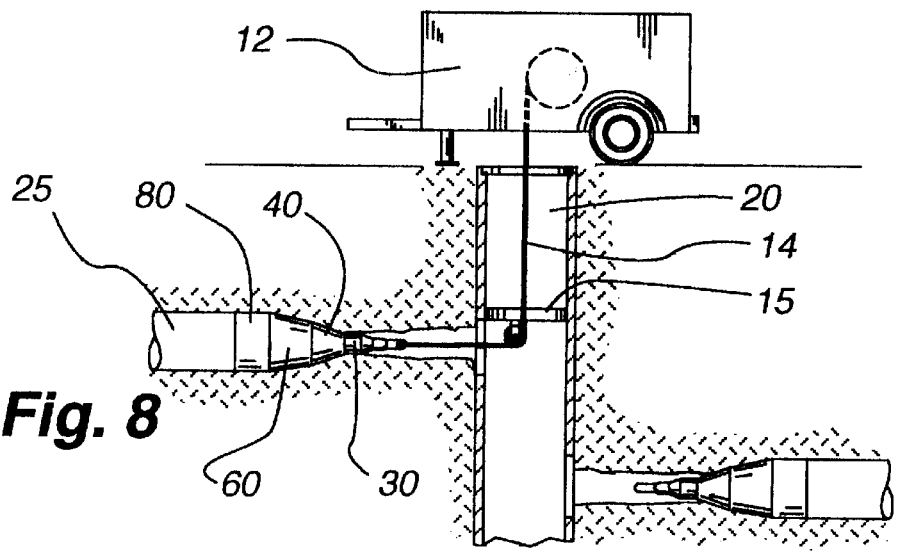
FIG. 8 is a side view of the bursting ram as utilized to install casing from different directions and terminating at a vault.
Figure 9A:
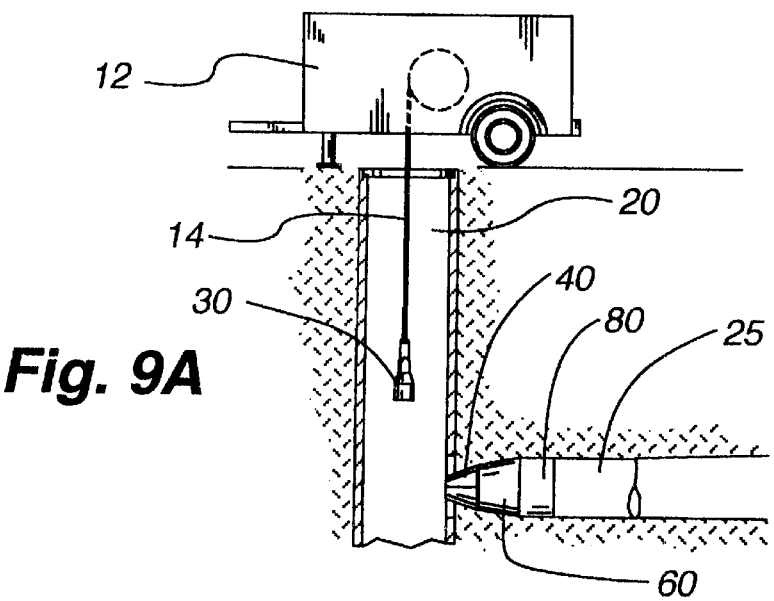
FIGS. 9A through 9E are side views illustrating in stages the disassembly and removal of the bursting ram from a vault.
Figure 9B:
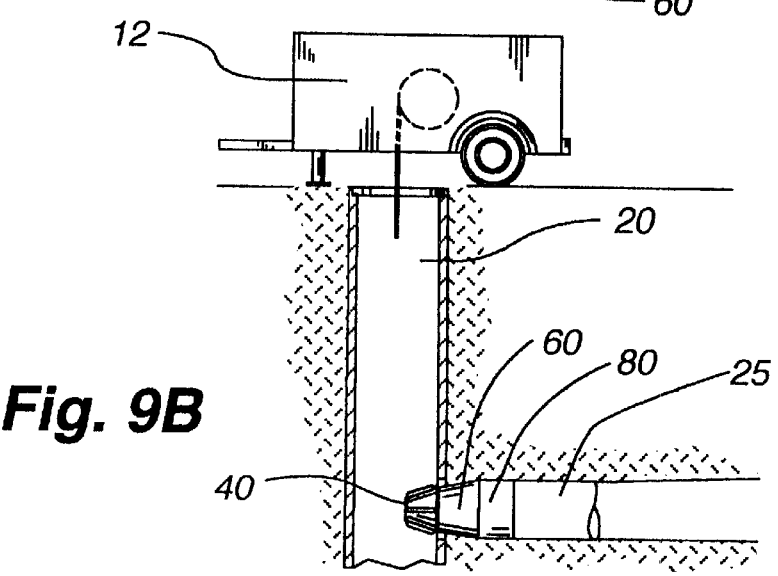
Figure 9C:
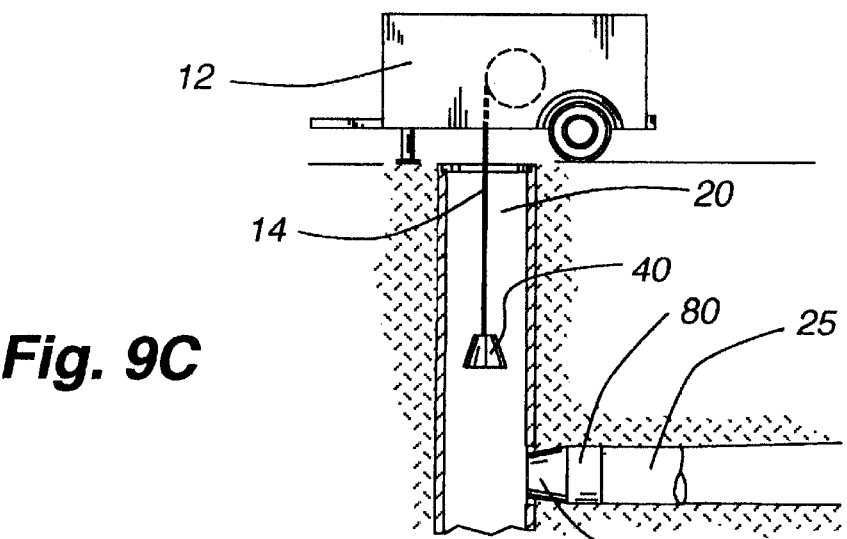
Figure 9D:
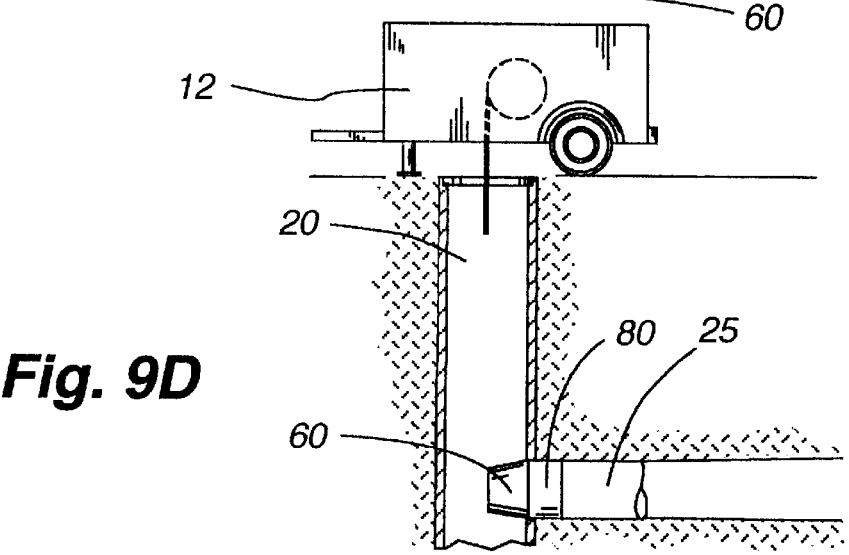
Figure 9E:
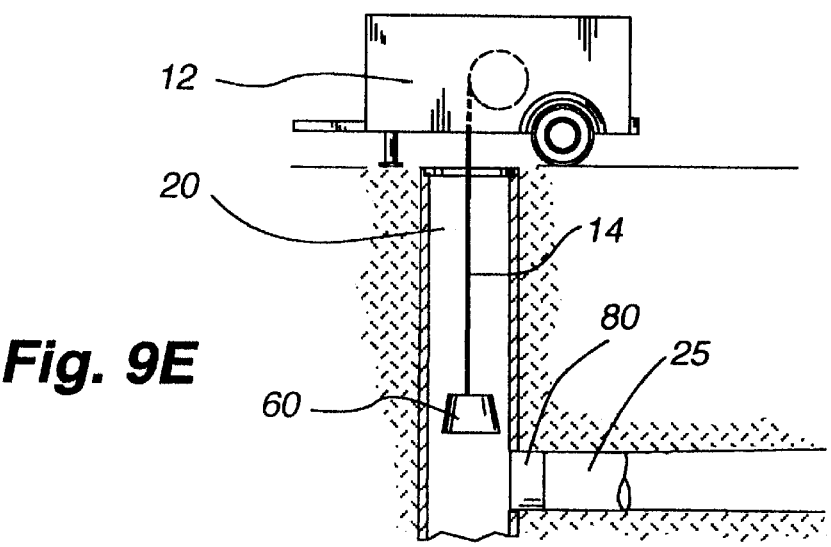

The detachable sections allow the bursting ram 10 to be disassembled and removed from a vault 20 or other confined space without requiring excavation in an inconvenient area, such as the middle of a busy street. In the event that a bursting operation is required beneath a street, building or other area where excavation would be costly and disruptive, an entry excavation may be performed at a more desirable location, such as a nearby parking lot or other vacant area. The entry excavation provides an entry point for the bursting ram 10 and casing 25, and allows long sections of casing 25 to be attached to the bursting ram 10, thus minimizing the number of couplings that are made of the casing and any inserted conduit or utilities. The entry excavation also provides the required clearance for powerful equipment to be attached to casing 25 to drive the bursting ram 10 and casing 25 through the existing pipe 18. If the winch 12 is required, the cable 14 may be fed through cable pulley 15, located in the vault, flowed or blown through the existing pipe 18, and attached to the bursting ram 10. The bursting ram 10, attached to the carrier ring 80 or directly to the first section of casing 25 to be installed, is placed at the opening of the existing pipe 18, and attached to the connecting eye 92 on the floating eye 22, or on the handling eye 33 on the centering cap 30. A hydraulic hammer or pneumatic hammer 16 or other driving apparatus may be attached at the end of the first section of casing 25 to be installed. The pneumatic hammer 16 is powered by supplying compressed air to its back end via air hose 17, which percussively drives the pneumatic hammer 16 against the casing 25. The bursting operation begins when the winch 12 creates tension in the cable 14 or the pneumatic hammer 16 is operated. Once the bursting ram 10 and first section of casing 25 are driven into the existing pipe 18, the next section of casing 25 is welded or otherwise attached to the preceding section. This process continues until the desired length of existing pipe 18 has been burst and replaced with casing 25 and the bursting ram 10 has been driven to a convenient removal point, such as vault 20. Existing sections of pipe 18 often approach a vault from different angles or may be offset as shown in FIG. 8. The pipelines may be aligned, but in order to preserve the integrity of the vault, the bursting ram 10 may be used from opposite directions to replace both sections of pipe 18. The only preparation required in the vault is to chisel out suitable openings for the new casing. Once the bursting ram 10 has been driven until the centering cap 30 has entered the vault 20, the centering cap 30 if used may be detached from the fracturing mandrel 90 and removed from the vault 20 (FIG. 9A). The casing 25 is driven farther until the fracturing mandrel 90 is completely within the vault 20 (FIG. 9B). At this point, the T assembly, FIG. 12, is loosened and turned 90° and disengaged from the connector piece 100 and access to the threaded bolts 54 is provided through the forward aperture 46 of the connector piece 100. Once the threaded bolts 54 are removed from the threaded bores 62 of the connector piece 100 it can be removed. In the case where only a winch 12 is used, the bursting ram 10 is pulled all the way into the vault and then disassembled. Where the winch 12 is used with the pneumatic hammer 16 or other ramming apparatus, the disassembly can occur as in the circumstance where a ramming method is used.

In the case where the vault 20 is located in the middle of a street and winch 12 is used, the winch 12 only needs to be placed over the vault 20 while the bursting operation is proceeding. Traffic may be diverted around the winch 12 during the bursting operation, and the normal flow of traffic may be quickly restored after the winch 12 is removed and the bursting ram 10 is retrieved from the vault 20.

Figure 1B:
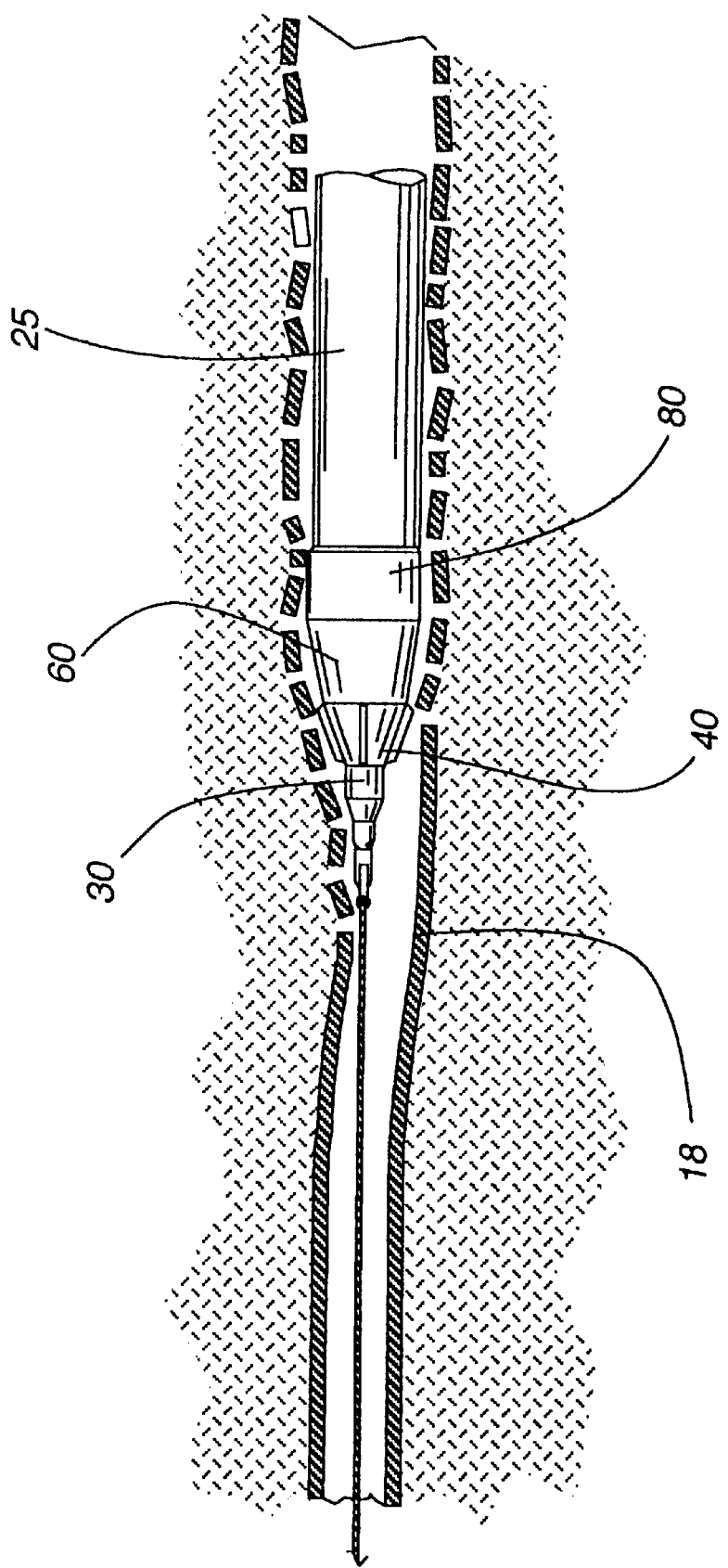
FIG. 1B is a side view of the bursting ram as utilized to repair bellies in pipelines.

As illustrated in FIG. 1B, the bursting ram 10 may be used to replace sections of ruptured pipe or bellies, where dips occur in the pipeline due to changes in the soil condition resulting from settling, construction, or other events. The bursting ram 10 repairs bellies in pipelines by replacing the pipe with casing 25 delivered in a straight course.

Figure 1C:
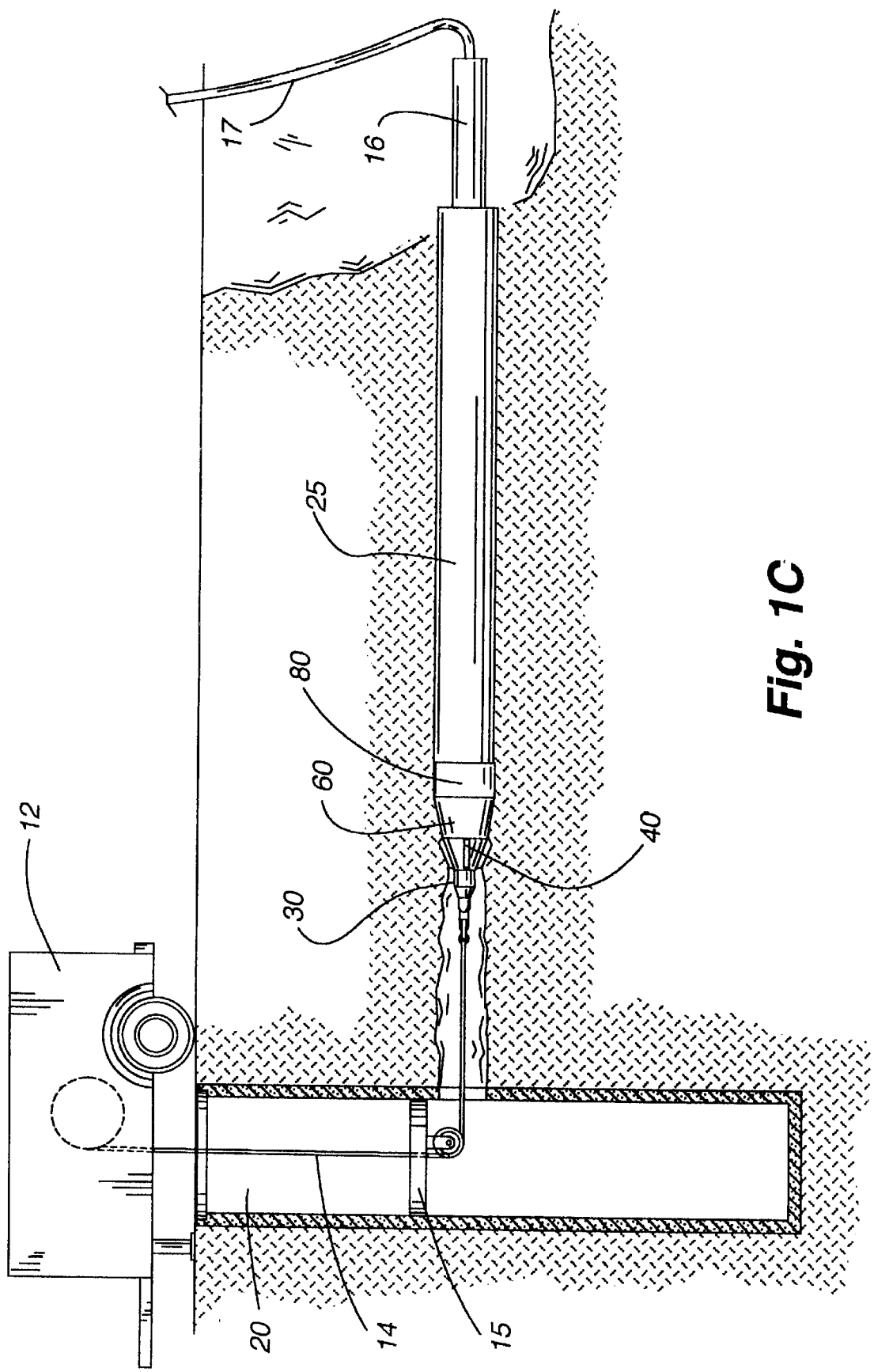
FIG. 1C is a side view of the bursting ram as utilized to install casing in a bored hole.

While the above description has focused on bursting existing pipe and replacing it with casing, the bursting ram 10 may also be used to install casing 25 in a bored pilot hole where no pipe exists. In this type of application, illustrated in FIG. 1C, the bursting ram 10 expands the pilot hole to a diameter capable of receiving the casing 25.

Once the casing 25 has been installed and the bursting ram 10 has been removed, the casing 25 may be slip lined with high density polyethylene, PVC, ductile iron, or other suitable material. Techniques for slip lining casing 25 are well known in the art and do not require discussion here. The installed casing 25 may also be used for applications other than plumbing, such as routing underground power lines, telecommunication lines, or other similar applications.

The method also allows for installing the lining materials at the same time as the sections of casing 25 are installed, thus saving time and operations. In addition, casing 25 with selected lining material attached or bonded to the inside wall of the casing 25 can be used. In making use of such casing the coupling method of the sections of casing necessarily must protect the integrity of the lining. Screw coupling of casing would be the preferred coupling.

The bursting ram 10 may be used to burst any fracturable material and may be used in any condition where the material surrounding the pipe or bore may be compressed. In the preferred embodiment, the fracturing mandrel 40 and expansion mandrel 60 are fabricated from mild, carbon, or hardened steel having a thickness of approximately 0.75 inch, but other materials of varying thicknesses may be used, provided they have sufficient strength to withstand the pressure of the fracturing operation, or are suitable for boring when the bursting ram 10 is driven through pilot hole without existing pipe. For applications where the objective is to replace 10 inch pipe with 18 inch casing, in the preferred embodiment, the centering cap 30 is approximately 12 inches long, and has an initial diameter of approximately four inches. The body of the centering cap 30 tapers to a diameter of approximately 6 inches. The forward aperture 46 of the fracturing mandrel 40 has a diameter of approximately 6 inches and the rear aperture 48 has a diameter of approximately 14 inches. In embodiment 90, the forward aperture is slightly larger than the shaft of the T assembly. The length of the fracturing mandrel is approximately 10 inches. In 90 the length may be 2 feet. The forward aperture 66 of the expansion mandrel 60 has a diameter of approximately 14 inches, and the rear aperture 68 has a diameter of approximately 18 inches. The length of the expansion mandrel 60 is approximately 13 inches.

However, the dimensions and apex angles of the fracturing mandrel 40 or 90 and expansion mandrel 60 may be modified so that casings of different dimensions may be used. Conversely, more sections may be added to the bursting ram 10 to allow expansion to greater diameters. However, each section should have sufficient dimensions to be removed from the vault, and should include attachment couplings to connect each section to adjacent sections.

While an improved apparatus for bursting underground pipelines and expanding holes while installing casing has been shown and described in detail in this application, it is to be understood that this invention is not to be limited to the exact form disclosed and changes in detail and construction of the various embodiments of the invention may be made without departing from the spirit thereof.

What is claimed is:

1. A bursting ram to expand a bore for installing new pipe, without trenching, to an end point, where it can be disassembled and removed in a small space comprising:
   a) a fracturing mandrel, in a frusto conical shape, with a forward aperture of a diameter less than the initial bore, and whose diameter gets larger toward a rear aperture where the diameter is approximately the size of the new pipe;
   b) an anchor shaped assembly made up of
      1) a shaft with an adjustable nut near one end; and
      2) a T piece on the other end having a length longer than its width;
   c) two parallel cross pieces spaced apart a distance more than the width but less than the length of the T piece;
   d) the two cross pieces connected to the leading end of the new pipe, perpendicular to the length of the fracturing mandrel and pipe;
   e) the anchor shaft is assembled with the T piece end exiting the rear aperture of the fracturing mandrel in a first position the T piece oriented so that it fits between and rearward of the two cross pieces, and the other end of the shaft extending out the front aperture of the fracturing mandrel with the adjustable nut forward of the fracturing mandrel;

f) where the anchor assembly is movable to a second position, by rotating the anchor about the axis of the shaft to where the lengthwise portion of the T piece is nearly perpendicular to and still behind the two cross pieces such that the T piece is abutted up against the cross pieces and cannot pass between the cross pieces; and g) the nut is adjusted to hold the shaft and T piece in this second position by abutting the forward aperture of the fracturing mandrel forming a clamping action with the T piece.

2. The bursting ram of claim 1, wherein;

a) the cross pieces are located in a connecting piece with its front aperture approximately equal to the rear aperture of the fracturing mandrel and its rear aperture approximately equal to the replacement pipe diameter;

b) where the front aperture of the connecting piece mates with the rear aperture of the fracturing mandrel; and c) where the rear aperture of the connecting piece is removably connected to the leading end of the new pipe during usage.

3. The bursting ram of claim 2 where the connecting piece has its diameter increase from its front aperture to its rear aperture.

4. The bursting ram of claim 2, wherein there are one or more intermediary frusto conical shapes;

a) where the forward aperture mates with the rear aperture of the proceeding piece in the assembly and its rear aperture mates with its successor piece in the assembly and each piece has the diameter of its rear aperture greater than its forward aperture; and b) wherein the assembly of the fracturing mandrel and any intermediary frusto conical shape is held by the anchor assembly compressing any intermediary shape inbetween the fracturing mandrel and the connecting piece.

* * * * *